3 Sheets—Sheet 1.

S. D. LOCKE.

GRAIN-BINDER.

No. 7,701. Reissued May 22, 1877.

WITNESSES:

C. Clarence Poole

N. B. Smith

INVENTOR:

S. D. Locke

By his atty

R. W. O. Smith

N. PETERS, Photo-Lithographer, Washington, D. C.

S. D. LOCKE.

GRAIN-BINDER.

No. 7,701. Reissued May 22, 1877.

WITNESSES:

A. B. Smith

N. B. Bates

INVENTOR:

S. D. Locke

By his atty.

R. D. O. Sinnett

N. PETERS, Photo-Lithographer, Washington, D. C.

S. D. LOCKE.

GRAIN-BINDER.

No. 7,701.

Reissued May 22, 1877.

WITNESSES:

N. B. Smith
H. C. Bates

INVENTOR:

S. D. Locke
By his atty
R. D. Smith

N. PETERS, Photo-Lithographer, Washington, D. C.

UNITED STATES PATENT OFFICE.

SYLVANUS D. LOCKE, OF HOOSICK FALLS, NEW YORK.

IMPROVEMENT IN GRAIN-BINDERS.

Specification forming part of Letters Patent No. 149,233, dated March 31, 1874; Reissue No. 7,701, dated May 22, 1877; application filed May 15, 1877.

*To all whom it may concern:*

Be it known that I, SYLVANUS D. LOCKE, of Hoosick Falls, in Rensselaer county, in the State of New York, have invented a new and useful Improvement in Automatic Binders; and I do hereby declare the following to be a full, clear, and exact description of the same, reference being had to the accompanying drawings, in which—

Figure 1:
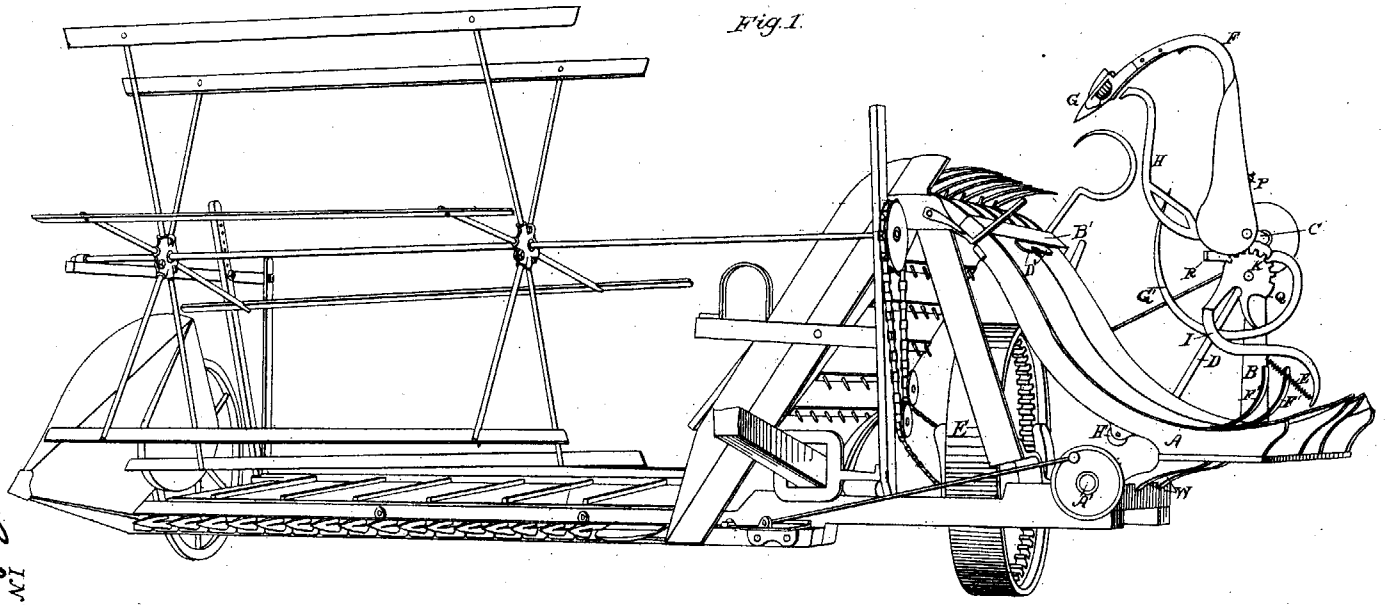
Figure 2:
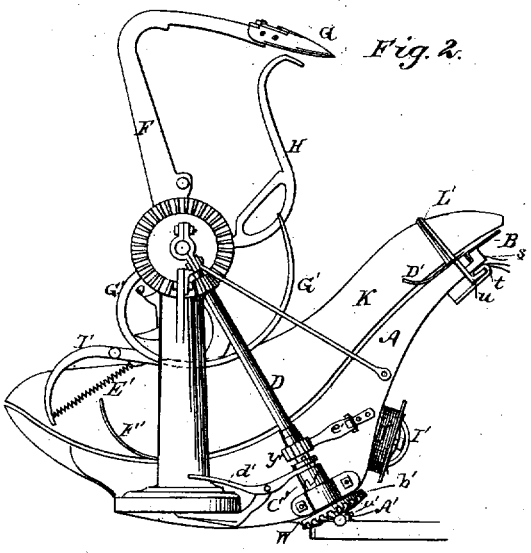
Figure 4:
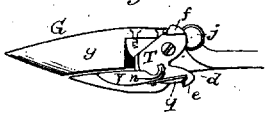
Figure 5:
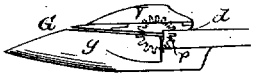
Figure 6:
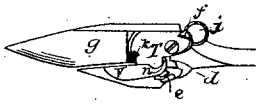
Figure 7:
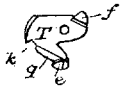
Figure 3:
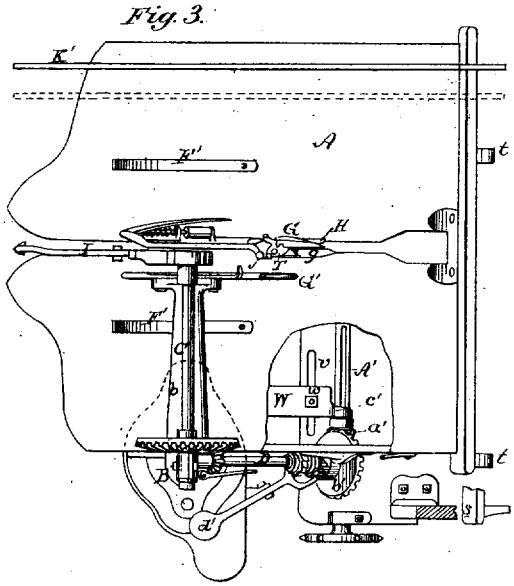
Figure 12:
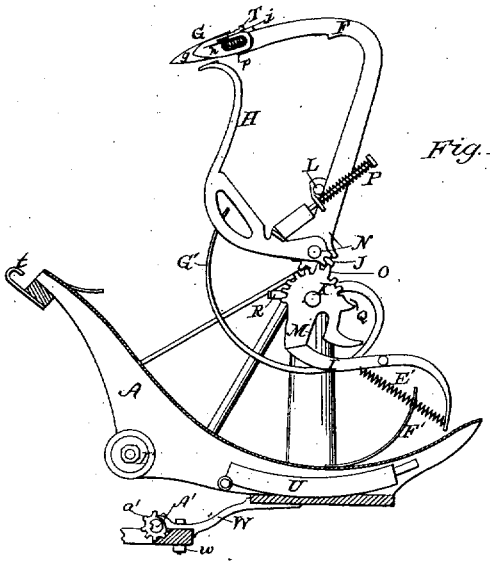
Figure 17:
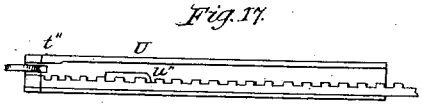
Figure 13:
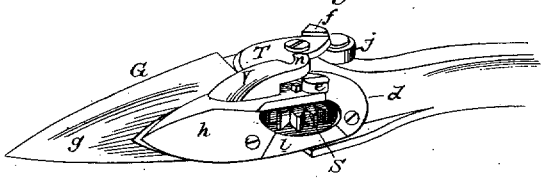
Figure 14:
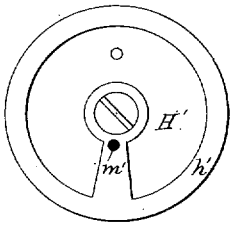
Figure 15:
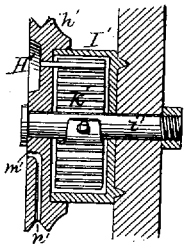
Figure 16:
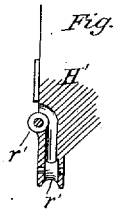

Figure 1 is a perspective view of a harvesting-machine with my attachment. Fig. 2 is an end elevation of my invention. Fig. 3 is a plan view of the same. Figs. 4, 5, 6, 7, 8, 9, 10, 11 represent parts assembled and detached of my binding-head. Fig. 12 is a cross-section elevation of my invention. Fig. 13 is a perspective view of my binding-head. Figs. 14, 15, 16 represent my take-up spool. Fig. 17 is a plan of the rack-box.

This invention relates to improvements in automatic binding-machines, and particularly on that class of binders to which belong improvements heretofore patented to me, 30th August, 1870, and particular reference is hereby made to said patent for a description of the general method of operation of my said invention, which consists, first, in mechanism to advance the compressing-arm faster than the binding-arm during a certain part of its revolution; second, in devices to limit the movement of the vibrating arm; third, in the method of constructing the binding-head; fourth, in stops to prevent the backward movement of the binding mechanism after the same has been thrown out of gear; fifth, in a permanent ledge to assist the binding-head to penetrate and separate the gavel; sixth, in the tension-spring upon the vibrating arm; seventh, in the retaining-springs to complete the separation of the bound from the unbound gavel prior to the discharge of the former; eighth, in a stationary fender-rod to prevent the grain from becoming entangled with the revolving mechanism of the binder; ninth, in a grain-receptacle movable with the binding mechanism to adjust the same according to the length of the grain to be bound.

That others may fully understand my improvement, I will particularly describe it.

On Sheet 1 of the drawings is represented, in perspective, the full machine, consisting of the reaping-machine with cutters, reel, and carrying and elevating aprons, and attached thereto the binding apparatus, which forms the subject of this patent.

The grain is delivered from the elevating apparatus in a continuous stream, which is received in and held by the cradle or receptacle A without the application of force other than its own gravity.

The cradle or receptacle A, in which the cut grain is delivered from the elevating-apron, is composed of a suitable frame-work, covered with sheet metal or other suitable material. At one side there is firmly bolted to said frame a pillar or standard, B, with an arm, *b*, projecting from the top thereof, and extending over said cradle to its center. The pillar B with its arm *b* supports the operative mechanism of the binder, which is driven through the medium of the shafts C and D and their pinions, actuated by and connected with the main driving-wheel E. At the outer end of the shaft C is mounted a binding-arm, F, which carries at its outer end the binding-head G and a compressor-arm, H. There is also pivoted to the end of the arm *b*, and operating in connection with the binding and compressing arms H F, a vibrating arm, I.

The above-named parts and their general mode of operation are described in my former patent referred to, and are herein set forth merely as the foundation of my present improvement, now to be particularly described.

Figure 8:
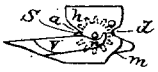
Figure 9:
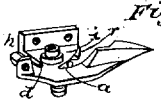
Figure 10:
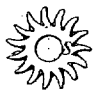
Figure 11:
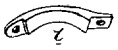

The arm F has upon its hub a segment-gear, J, which meshes with a corresponding segment, K, upon the hub of the arm I, whereby said arm I is actuated in one direction as the arm F rotates, and is moved in the opposite direction by means of the pin L and cam M, as described in my prior patent above referred to; but I desire to impart to the compressor H a more rapid advance during that portion of its revolution which is at the apex of its circuit, and I therefore attach to the hub of said compressor H two teeth or cogs, N, and to the segment K I attach two corresponding teeth, O, projecting beyond the teeth of said segment, which are adjusted to mesh with each other at the proper moment, and impart to the compressor a more rapid advance, as stated. When said gears N O go out of mesh, the arm H recovers its position by the action of the spring P. The momentum of the moving parts is considerable, and as the arm I is for a moment during each revolution twice out of gear with those parts which actuate it, its momentum may sometimes be so great as to carry it too far for proper engagement again, unless provision is made to limit its movement at each extremity. I have therefore placed upon the arm I a stop, Q, which, coming in contact with the hub of arm F, prevents further movement of arm I in that direction; and, to limit the motion of said arm in the opposite direction, I have fixed to the arm *b* a stop, R, though it may be arranged like the stop Q by a projecting portion of the hub of said arm. One or both of said stops may be made adjustable by means of screws. The binding-head G is constructed in two parts, one being the pointed inclosing-shell *g*, and the other the base-block or shield *h*, which is located partially within said shell, and secured there by screws. The form of the part *a* is shown in Fig. 8.

On the inner side of the base *h* there is a stud, *i*, upon which the twisting-pinion S is mounted, as secured by a screw, and on the other surface, opposite said twisting-pinion, the clamping nipper-plate T is mounted. At *a* and *d* the base-plate *h* is cut away or notched, so as to admit the binding-wire to approach and enter between the teeth of the twister, which consists of a single pinion, S, projecting from said head on one side thereof far enough to engage with the rack U to receive therefrom its rotary motion.

The clamping-nipper T is pivoted to the outer side of the base-plate *h*, and is actuated by the contact of one or the other of studs *e* *f*, with properly-disposed cam-surfaces *u″* *t″* located in the rack-box U. The front edge of said nipper is provided with a notch, *k*, and it works under stationary plate V, clamping the end of the band-wire thereunder, while it, by the same movement, cuts the wire free from the sheaf by means of said notch *k* acting against a stationary cutting-edge, formed by a steel plate, *m*, inserted in the base-plate *h*. The thickness of the nipper-plate is not quite equal to the thickness of the space within which it moves beneath the plate V, so that the binding-wire may be drawn under said plate by the notch *k*, and clamped there, while the head G is being carried around the gavel.

During this movement around the gavel the binding-wire becomes bent backward over the hooking end *n* of the plate V, and downward through the space or notch *d*, where it enters between two of the leaves of the twister, and at this moment the compressor H advances, as heretofore described, and pushes the binding-wire in front of the ledge *p*, whereby it is prevented from escaping from its position in the twister. The further movement of the binding-head G carries it entirely around the gavel, and, as it enters the rack-box U, the spool end of the binding-wire enters the space or notch *a*, and between the leaves of the pinion S on the side opposite the clamped end of the wire. The pinion S then engages with the rack in rack-box U, and begins to twist the wires together, and, at or about the same instant, the nipper is opened by contact of stud *f* with a cam properly located in box U, so as to release the clamped end of the wire, and immediately closed again by contact of stud *e* with another cam in said rack-box, thus severing the wire and clamping it again for the next sheaf.

That portion of the nipper-plate T which is along the edge at *q* is in thickness equal to space below the plate V, so that the clamped end of the wire is pushed out from under said plate, and therefore enabled to become jammed thereunder, or prevent the free working of the parts.

The part *l* is made detachable, so as to permit the removal of the twister S from its stud. The roller *j* traverses the inner surface of the rack-box to prevent friction of the head G thereon.

From year to year, or from one field to another, grain will stand at different heights, so that it is necessary either to move the gavel lengthwise in the binder or to adjust the binding mechanism on the main frame, so that the band will be placed around the middle of the sheaf.

I have constructed my binding-machine with its cradle or receptacle, so that it can readily be moved sidewise to adjust the binding mechanism according to the length of the straw of the grain which is to be bound. Heretofore the binding mechanism has been made adjustable, so as as to place the band around the bundle about midway of its length; but such adjustment has not included, or only partly included, the binding table or receptacle, and there has, therefore, necessarily been left in said table or receptacle a slot or slots capable of permitting the passage of the band-carrier throughout its range of adjustment. This slot must, therefore, be from seven to twelve inches in width, and requires a movable covering of some kind to prevent the stalks of grain from being drawn down through it.

This difficulty is completely obviated by my machine, wherein the receptacle is made adjustable, and I prefer to couple the receptacle and binder together, so as to move with each other, so that the said slot need not exceed the width necessary to permit the passage of the band-carrier.

In the only instance known to me where the binding mechanism and platform have been made bodily adjustable, the latter was not intended nor adapted to receive and support the grain in its free condition; but, on the contrary, was of such construction as to require the agency of a clamping device to retain the grain until the binding-arm had operated.

In my invention, however, the receptacle is so made that the grain, as it comes from the delivering apparatus, is received and sustained irrespective of the position of the receptacle in its free condition without auxiliary agencies.

In machines, particularly where the binder-arm moves the gavel before it as the band is being secured, this capability of receiving and holding the grain in a free condition in any adjustment is of great advantange.

I also arrange the connections so that the entire binding apparatus may be readily detached and removed from the frame of the reaper, when for any reason such removal is desirable.

To this end I attach the upper edge of frame A to the upper bar *s* of the elevator-frame by means of hooks *t*, which are permanently secured to said frame A, and engage with flange plates or ledges attached to said bars. The lower end of the frame A is supported upon feet W, which are secured to the frame, and rest against the end bar *v* of the reaper-frame. Bolts *w* passing downward through the feet W and the beam *v* secure the binding apparatus firmly in place, and by elongating the bolt-holes in the beam *v*, or by a series of such holes, any required lateral adjustment of said binding apparatus may be secured; or by removing said bolts the entire binding apparatus may be removed from the main frame.

In the machine represented on Sheet 1 of the drawings, a shaft, A′, is laid across the reaper-frame to transmit motion from the main wheel E to the cutters and traveling belts, and upon said shaft I place a bevel-pinion, *a′*, to mesh with and drive the bevel-pinion *b′* fastened to the lower end of the shaft D, and motion is thereby transmitted from the driving-wheel to the binding mechanism. I arrange said pinion *a′* to slide upon said shaft upon a spline or feather, and to keep it always in mesh with the wheel *b′*, a toe, *c′*, is placed upon the foot W, so as to prevent the said pinion from backing off. A stationary apron, B′, is secured to the bar *s* to project over and cover the joint or seam between the binding-machine and said bar *s*, and to prevent the lodgment of grain therein.

If the grain stands thin upon the ground, it may happen that during the time of one revolution of the binding-arm an insufficient quantity of grain will have been cut for a proper-sized sheaf; and it is therefore required that the attendant may stop or start the binding mechanism at will. I therefore arrange a ratchet-clutch, C′, upon the shaft D, whereby, with the treadle *d′*, the binding mechanism may be thrown out of gear at any moment, but when so stopped the weight of the revolving arms might cause them to move forward or backward into inconvenient positions, unless restrained. I therefore place upon the shaft D a ratchet, *g′*, with which a spring-pawl, *e′*, engages. The clutch is made with double faces, so that the arm cannot revolve any faster than its driving-shaft during those portions of its revolutions when the weight of the said arm tends to accelerate its movement.

Small ledges D′ are placed on the surface of the grain-receptacle just opposite the orifice through which the binding-head G enters the mass of cut grain to separate it into gavels. These ledges turn outwardly from said surface in a direction nearly horizontal, and their effect is to cause the mass or sheet of descending grain to assume a horizontal direction at that point, so that the head G will penetrate and separate it with greater ease and less liability to entanglement with the stalks of grain.

The arms H I, between which the grain-stalks are gathered and compressed to form a sheaf, though moving with a positive motion, yet necessarily move with an elastic pressure, so that the said arms may accommodate themselves to gavels of different sizes, and also avoid the harsh and sudden compression of the gavel, which would otherwise occur, whereby the straw might be broken. I therefore place upon the arm H the spring X′, and, auxiliary thereto, the tension-spring E′ is placed upon the arm I. This latter spring may be made of any suitable elastic material. It aids more particularly in gathering the bundle prior to its full compression between the yielding arm H and the rigid arm I, and thereby prevents the drawing out of an unnecessary length of binding-wire.

I attach to the cradle two light flat springs, F′ F′, which prevent the sheaf from swinging out of position just prior to the moment of discharge, when it has been liberated from the arm I, and by their recoil, when the sheaf has passed over them, they effect a complete separation of the unbound grain from that which has been bound.

It sometimes happens that the grain lies upon the cradle in a thick loose mass. This may be in consequence of its being somewhat tangled, and in this condition it sometimes becomes entangled with the segment-gears of the arms F′ I′; and to prevent such entanglement I attach to the arm *b* a stationary fender-rod, G′. The slack wire is taken up at each revolution by a spring take-up spool, H′, located beneath the cradle. Said spool is constructed with a grooved disk, *h′*, mounted upon a spindle, *i′*, which latter is firmly secured to the frame A. A coiled spring, *k′*, having one end secured to said spool and the other end to said spindle, serves to actuate it, and a surrounding case or barrel, I′, incloses and protects the spring. The case I′ is closed at one end, and provided with several spurs, which penetrate the wood of the frame A, and keep it securely in position. The spindle *i′* has a shoulder, which comes down upon the bottom of the case I′, and thereby prevents it from turning around. The spool H′ is rotated until the spring has sufficient tension to take up the required slack of the binding-wire, which is then passed through the orifice *m′*, and out into the groove *n′*.

When the binding-head makes its circuit around the gavel, so much wire is drawn from the wheel J′ as will equal the circle described by said binding-head, and this quantity is in excess of that required to pass around the sheaf. The recoil of the spring $k'$ rotates the spool H′ and takes up the surplus. The case I′ serves as a brake on the spring, or a limit to its expansion, if the binding-wire should be suddenly broken. In such event the spring would rapidly uncoil until the pressure of the revolving spring against the case gradually checks its motion; otherwise the rapid revolution of the spring and spool and their momentum would cause the breakage of the center coil or its connection with the spindle $i'$.

The orifices through which the binding-wire passes may be re-enforced by bushing, or protected by friction-rollers, as at $r'$.

I place a removable wind-board, K′, along the front edge of the binder-cradle, to prevent the disturbance of the cut grain by the wind, and said board is secured between the arms L′, which are secured to the bar $s$ or other convenient part of the reaper-frame, so that said board is not attached to the binder; and when the latter is adjusted upon the reaper-frame, it slides under said wind-board, which therefore needs no adjustment.

Having described my improvement, what I claim as new is—

1. In combination with the binding-arm F and vibrating compressor I, and the segment-gears by which the latter is actuated, the compressor H and the extra gears O N, whereby said compressor H is advanced faster than the binding-arm, substantially for the purpose set forth.

2. In combination with the binding arm F and the vibrating compressor I, the stops Q R, to limit the vibrations of said compressor, as set forth.

3. The pointed hollow shell $g$, formed to receive the base-plate of the shield $h$, which supports the twisting and cutting devices, and partially incloses said twisting and cutting devices, as set forth.

4. In combination with the main shaft D, for giving motion to the operative mechanism of an automatic binder, the ratchet and pawl $g'$ $e'$, to hold said binding mechanism from retrograde motion when the same may be uncoupled from the driving mechanism.

5. In combination with the gathering-arm F, the ledge D upon the cradle A, to hold the grain in position while said arm passes through and separates the gavel.

6. In combintion with the vibrating compressor I, the tension-spring E, stretched across the curve of said arm, substantially as set forth.

7. The cradle A, provided with the retaining-springs F′, substantially as and for the purpose set forth.

8. In combination with the laterally-adjustable binding attachment, the stationary wind-board K′, attached to the frame of the harvester, but unattached to said binder.

9. In combination with the revolving compressor and binding-arms and cradle of an automatic binder, the stationary fender-rod G′, as set forth.

10. The holding-plate V, combined with the cutting-nipper T, which is provided with studs $e$ and $f$, to be operated by cam-surfaces $u''$ $t''$ in the rack-box.

11. In combination with the twisting-pinion S and operative mechanism of the binding-head, the vibrating nipper and cutter T and holding-plate V $n$, as set forth.

12. The cutting-nipper T, constructed with a shoulder, $q$, for the purpose set forth.

13. In an automatic binding-harvester, a grain-delivery apparatus, combined with a receptacle to receive the grain therefrom and support it in a free state, adjustable transversely and bodily along the end of said delivery apparatus, for the purpose set forth.

14. In an automatic binding-harvester, a grain-delivery apparatus, combined with a receptacle to receive and support said grain in a free state, and a binding mechanism attached thereto, adjustable along the end of the delivery apparatus, for the purpose set forth.

S. D. LOCKE.

Witnesses:
R. D. O. SMITH,
N. B. SMITH.